United States Patent
Miller et al.

(10) Patent No.: US 12,202,722 B2
(45) Date of Patent: Jan. 21, 2025

(54) MODULAR ROTARY UNION

(71) Applicant: KNAUF GIPS KG, Iphofen (DE)

(72) Inventors: Brent Miller, Sandusky, OH (US); Clinton Hattaway, Plano, TX (US)

(73) Assignee: KNAUF GIPS KG, Iphofen (DE)

( * ) Notice: Subject to any disclaimer, the term of this patent is extended or adjusted under 35 U.S.C. 154(b) by 243 days.

(21) Appl. No.: 18/060,361

(22) Filed: Nov. 30, 2022

(65) Prior Publication Data

US 2023/0312332 A1 Oct. 5, 2023

Related U.S. Application Data

(60) Provisional application No. 63/362,157, filed on Mar. 30, 2022.

(51) Int. Cl.
*B67D 7/78* (2010.01)
*F16L 39/04* (2006.01)

(52) U.S. Cl.
CPC ............... *B67D 7/78* (2013.01); *F16L 39/04* (2013.01)

(58) Field of Classification Search
CPC ................................. B67D 7/78; F16L 39/04
See application file for complete search history.

(56) References Cited

U.S. PATENT DOCUMENTS

| | | | | |
|---|---|---|---|---|
| 2,503,639 A | * | 4/1950 | Rush | F16K 5/0464 285/280 |
| 3,130,744 A | * | 4/1964 | Collins | A01J 25/10 137/625.11 |
| 3,508,582 A | * | 4/1970 | Aulisa | F16L 39/04 137/625.11 |
| 4,781,404 A | * | 11/1988 | Tharp | F16L 39/06 285/94 |
| 5,683,635 A | * | 11/1997 | Sucech | C04B 28/14 264/43 |

(Continued)

FOREIGN PATENT DOCUMENTS

| | | |
|---|---|---|
| DE | 423 846 C | 1/1926 |
| GB | 690 215 A | 4/1953 |

OTHER PUBLICATIONS

International Search Report and Written Opinion received for PCT/US2023/016268, mailed Aug. 21, 2023.

*Primary Examiner* — J C Jacyna
(74) *Attorney, Agent, or Firm* — Greer, Burns & Crain, Ltd; Philip T. Petti; Pradip Sahu

(57) ABSTRACT

A rotary union for distributing flowing material, and includes a central shaft having an upper end defining at least one inlet configured for receiving the material, and being in communication with a pocket configured for receiving the material, a lower end of the pocket defining at least one outlet port. An annular sleeve surrounds and rotates relative to the central shaft, the sleeve being provided with a plurality of radially-spaced outlet nipples. A gap is defined between an exterior surface of the central shaft and an interior surface of the sleeve, and at least one seal is disposed in the gap for isolating the gap from the material flowing through the outlet port and into the nipples. The central shaft is provided in vertically-stacked components including an upper, inlet portion, a middle or central delivery portion including the pockets and the outlets, and a lower-most base portion.

14 Claims, 3 Drawing Sheets

(56) References Cited

U.S. PATENT DOCUMENTS

| | | | |
|---|---|---|---|
| 7,007,914 B2 * | 3/2006 | Petersen | F16K 7/06 |
| | | | 251/4 |
| 2002/0043800 A1 * | 4/2002 | Montgomery | F16L 39/04 |
| | | | 285/95 |
| 2021/0114857 A1 | 4/2021 | Miller et al. | |

* cited by examiner

MODULAR ROTARY UNION

RELATED APPLICATION

The present application is a Non-Provisional of, and claims 35 U.S.C. 119 priority from, U.S. Patent Application Ser. No. 63/362,157 filed Mar. 30, 2022, the entire contents of which are incorporated by reference herein.

BACKGROUND

The present invention generally relates to apparatus for filling containers with bulk material having high viscosity, such as ready mixed wallboard joint compound or the like, and more specifically to an improved rotary union used for volume-based filling of containers in a mass production setting.

Wallboard joint compound is provided in two formats: dry powder and ready mixed. The latter formulation is a viscous, flowable composition similar to very thick oatmeal or soup. Production facilities for such joint compound include packaging operations where the formulation is automatically filled into plastic pails or plastic-lined cardboard cartons.

Ready mixed, also referred to as premixed wallboard joint compound, is well known in the field of interior construction for use in filling and smoothing joints or seams between adjacent wallboard panels. Typically used in conjunction with wallboard joint tape in the process of finishing the interior walls, joint compound is conventionally provided in two formats, a dry mix provided in powder form in bags that are mixed with water on the job site, and ready mixed, in which the joint compound composition is thoroughly mixed with water at the factory into a paste-like consistency, so that upon opening the container at the jobsite, the joint compound may be directly applied from the package to the wallboard joint and/or to the joint tape. In practice, many operators opt to add water to the ready mixed formulation prior to its application to the wallboard joints to reduce viscosity and aid spreading.

Ready mixed joint compound is conventionally provided in 3.5 or 5 gallon pails, or 3.5 or 4.5 gallon lined cartons, collectively referred to as containers. In the manufacturing plant, these containers are filled in a designated package fill line, where containers are sequentially conveyed to a fill point. At the fill point, a hopper assembly is connected to a nozzle having an internal rotating auger that dispenses a preset supply of highly viscous, paste-like, ready mixed wallboard joint compound. Preferably, the nozzle is located at a fixed height that clears a top margin or lip of any container to be filled. Such containers are filled from the nozzle to a given weight, or to a given volume, depending on the manufacturer, formulation of product and type of container.

Conventional automated wallboard joint compound filling equipment often includes a rotary union, which is formed from an outer sleeve rotating about a fixed, vertically projecting shaft. Joint compound is fed from a storage hopper into at least one inlet or pocket in an upper end of the shaft. The compound then flows down into a series of radially-spaced outlet ports, which are in selective communication with outlet nipples on the outer sleeve. Conventional rotary unions are provided with six outlets, radially spaced 60° apart from each other. Preferred operation is fast enough that at least 60 containers are filled per minute. As the sleeve rotates, the nipples come into fluid communication with the outlet ports. Often the nipples are provided with delivery elbows, and joint compound is delivered to a waiting container that is positioned for receiving the compound from the nipple. Seals such as O-rings are provided above and below the nipples between the shaft and the sleeve for preventing unwanted migration of joint compound into the junction between the sleeve and the shaft. Also, conventional rotary unions are provided with suitable bearings for reducing rotational friction between the sleeve and the shaft. The seals also inhibit unwanted migration of joint compound to the bearings.

A common problem with such rotary unions is that the ready mixed joint compound is very abrasive. As such, extended operation of the rotary union results in significant erosion of the components, particularly the fixed shaft, despite the fact that the shaft is made of corrosion-resistant stainless steel. Such erosion is concentrated at the interface of the outlets and the sleeve nipples, and a protective coating on the shaft is often destroyed in this area. Over time, the shaft itself is attacked, and a significantly large gap is created at the interface, which enhances the further corrosion of the surrounding areas. Also, the seals, preferably O-rings, are also subject to premature wear due to such abrasion. If left unattended, the unwanted joint compound clogs the drive system of the union, ruins the clutch, displaces the protective grease and corrosion often extends to the bearings, causing premature failure.

Conventional unions require frequent replacement of the fixed shaft, which is time consuming, expensive in terms of the amount of stainless steel involved, as well as the labor and down time of the packaging equipment. Accordingly, there is a need for an improved rotary union which addressed the above-listed drawbacks of conventional apparatus.

SUMMARY

The above-listed need is met or exceeded by the present modular rotary union, which features a multi-part shaft divided into three individual components: an upper, inlet portion; a middle or central delivery portion including the pockets and the outlets; and a lower-most base portion. An important feature of the present union is that the upper, middle and base portions are assembled together to form a fixed unit. While the portions are readily disassembled, complementary anti-rotation formations prevent relative rotation of the portions during operation. Preferred formations are mating pins and bores, lugs and recesses or sockets, or the like on opposing surfaces of the respective portions. It is contemplated that the middle, delivery portion will experience the most erosion, and will be replaced more frequently than the upper and base portions.

Accordingly, instead of replacing the entire shaft each time the unit begins to fail due to erosion, the operator replaces only the failed middle portion. At the same time the middle portion is replaced, the O-ring seals are also replaced. As such, depending on the size of the union, the present configuration reduces required downtime to repair, and also removes the requirement for keeping an entire spare shaft for replacement. Using the present configuration, maintenance costs are reduced in the form of reduced downtime and the reduced expense of replacement parts, since fewer parts are replaced.

Another feature of the present modular union is a water flush system, which uses jets of pressurized water to periodically flush unwanted joint compound from the interface of the outlets and the sleeve nipples. Such a system prolongs the working life of the rotary union as a whole, and also specific components, such as the middle shaft portion and seals.

More specifically, a rotary union is provided for distributing flowing material to open packages, and includes a central shaft having an upper end defining at least one inlet configured for receiving a supply of the flowing material, and being in communication with a pocket defined in the shaft and configured for receiving the material, a lower end of the pocket defining at least one outlet port. An annular sleeve is configured for surrounding and for rotating relative to the central shaft, the sleeve being provided with a plurality of radially-spaced outlet nipples. A gap is defined between an exterior surface of the central shaft and an interior surface of the sleeve, and at least one seal is disposed in the gap for isolating the gap from the material flowing from the pocket through the outlet port and into the nipples. The central shaft is provided in vertically-stacked components including an upper, inlet portion, a middle or central delivery portion including the pockets and the outlets, and a lower-most base portion.

In another embodiment, the portions have complementary locating formations for maintaining the portions in fixed relationship to each other upon assembly. In a preferred embodiment, the complementary locating formations include engaging pins and sockets on opposing surfaces of the portions.

In an embodiment, the nipples are spaced at 60° from each other around the sleeve. In a preferred embodiment, at least one nipple is provided with a radial extension projecting beyond an outer surface of sleeve.

In an embodiment, the at least one seal includes at least one upper seal located in the gap above the nipples, and at least one lower seal located in the gap below the nipples.

In an embodiment, bearings are provided at upper and lower ends of the sleeve in operational relationship to the shaft.

In an embodiment, at least one water supply conduit is associated with the union and is constructed and arranged for flushing the gap in a space defined between at least one upper seal and at least one lower seal. Preferably, the at least one water supply conduit is configured for directing a flow of fluid from the gap to the nipples.

In a preferred embodiment, the water supply conduit includes a main conduit located in the shaft, and at least one supplemental conduit in fluid communication with the main conduit, and located in the sleeve.

In another embodiment, a rotary union for distributing viscous material to open packages includes a central shaft having an upper end defining at least one inlet configured for receiving a supply of the viscous material, and being in communication with a pocket for the viscous material defined in the upper end, a lower end of the pocket defining at least one outlet port. An annular sleeve is configured to surround and to rotate relative to the central shaft, the sleeve is provided with a plurality of radially-spaced outlet nipples. A gap is defined between an exterior surface of the central shaft and an interior surface of the sleeve, and at least one seal disposed in the gap for isolating the gap from the viscous material flowing from the pocket through the outlet port and into the nipples, the at least one seal including at least one upper seal and at least one lower seal. The central shaft is provided in vertically-stacked components including upper, inlet portion, a middle or central delivery portion including the pockets and the outlets, and a lower-most base portion. At least one water supply conduit is associated with the shaft and constructed and arranged for flushing the gap in a space defined between at least one upper seal and at least one lower seal.

DETAILED DESCRIPTION

Figure 1:
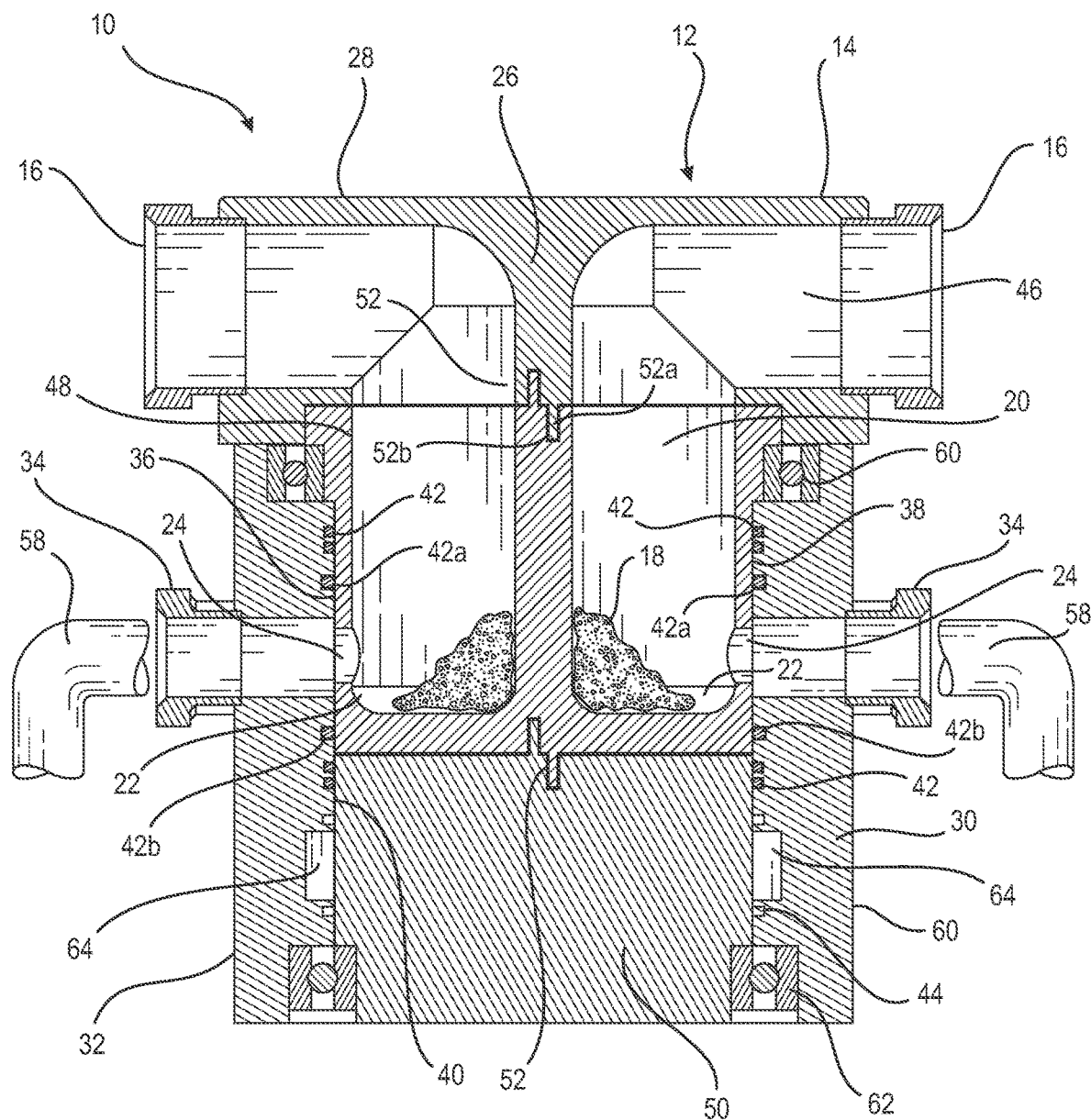
FIG. 1 is a vertical cross-section of the present modular rotary union.
Figure 2:
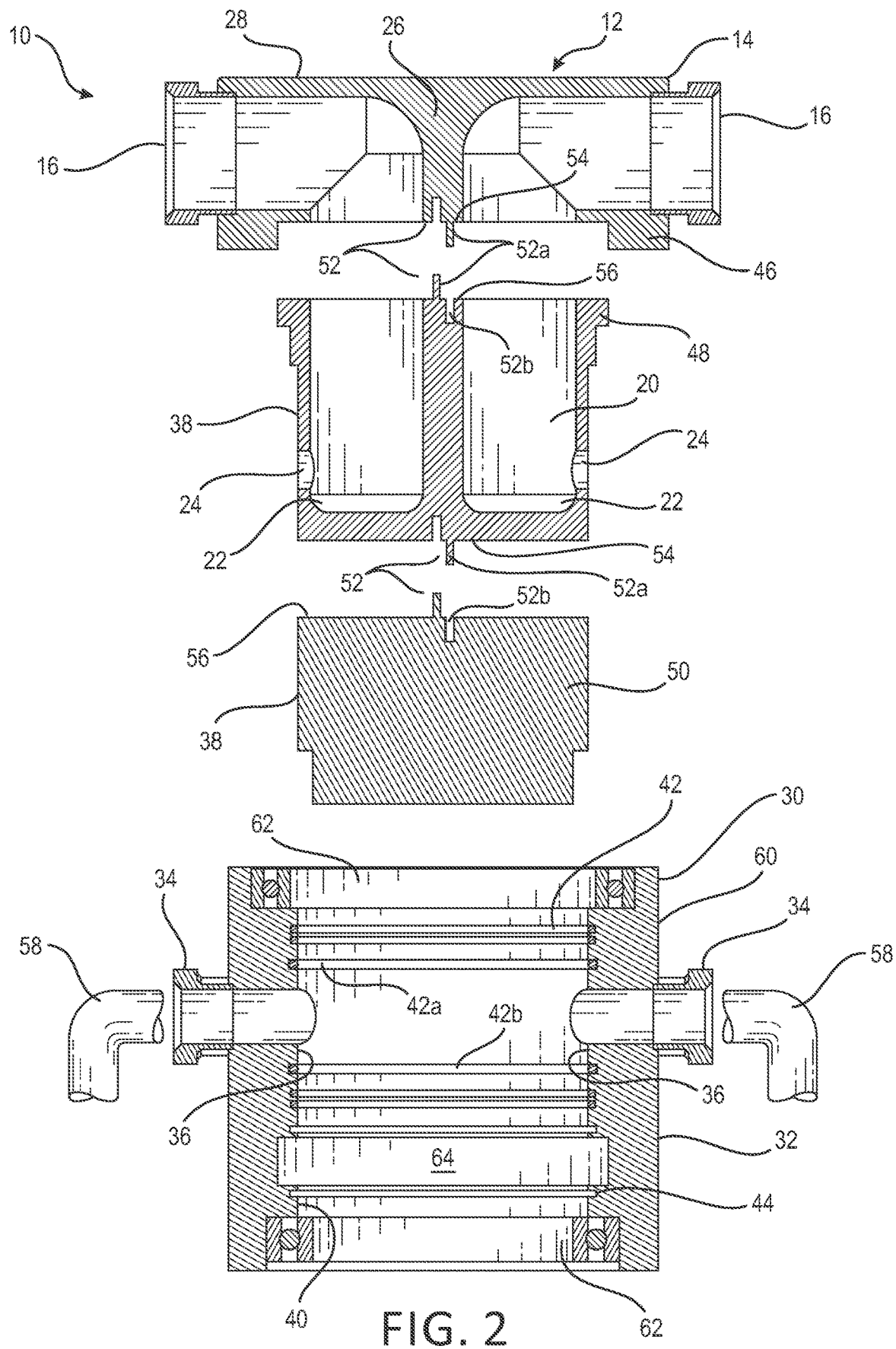
FIG. 2 is an exploded cross-section of the modular rotary union depicted in FIG. 1.

Referring now to FIGS. 1 and 2, a rotary union for distributing flowing material to open packages is generally designated 10. This form of rotary union 10 is of the type used in production facilities for wallboard joint compound and is used for filling multiple open containers with ready mixed joint compound on a mass-production basis. Included in the present rotary union 10 is a central shaft 12 having an upper end 14 defining at least one inlet 16 configured for receiving a supply of the flowing material 18 (FIG. 1), and being in communication with a pocket 20 for the material 18 defined in the upper end 14. In the preferred embodiment, there are a pair of diametrically opposed inlets 16, each in fluid communication with the pocket 20. A lower end 22 of the pocket 20 defines at least one outlet port 24.

A vertically-projecting support 26 is preferably centrally located in the upper end 14. In the preferred embodiment, the support 26 is integrally formed as by casting or the like, with a generally planar upper surface 28 of the upper end.

Also included in the rotary union 10 is an annular sleeve 30 configured to surround and to rotate relative to the central shaft 12. The annular sleeve 30 functions to distribute flowing joint compound 18 from the pocket 20, to the outlet ports 24 to open containers (not shown) distributed about a periphery 32 of the sleeve. A plurality of radially-oriented, peripherally spaced outlet nipples 34 receive the joint compound and distribute the compound into the waiting open containers.

In operation, the present rotary union 10 is installed upon a pedestal (not shown) as is customary in the art. The pedestal includes a drive mechanism which is configured for rotating the annular sleeve 30 relative to the fixed central shaft 12. In the preferred embodiment, a pneumatically-powered cylinder system is incorporated into the pedestal to effect the rotation of the annular sleeve 30. Other drive systems, including but not limited to electric or hydraulic drives are contemplated. Also included on the pedestal is a cammed lifting mechanism (not shown) which receives each empty container to be filled, and raises the container towards the outlet nipple 34 for filling. After filling, the cammed lifting mechanism automatically lowers the filled container and prepares to receive and lift another empty container.

Returning now to FIGS. 1 and 2, upon the assembly of the annular sleeve 30 about the fixed central shaft 12, a gap 36 is defined between an exterior surface 38 of the central shaft and an interior surface 40 of the sleeve. Also, at least one seal 42 is disposed in the gap 36 for isolating the gap from the material 18 flowing from the pocket 20 through the outlet port 24 and into the outlet nipples 34. In the preferred embodiment, the seals 42 are "O"-rings disposed in complementary grooves 44 in the interior surface 40 of the annular sleeve 30. However, similar grooves 44 are contemplated for the central shaft 12 as long as they fill the gap 36. An important function of the seals 42 is to prevent the migration of leaked flowing wallboard joint compound 18 from the flow path through the pocket 20, then the outlet ports 24, then the outlet nipples 34. It has been found that the joint compound 18 readily seeps into the gap 36 above and below the above-listed flow path. This migration of joint compound 18 has been found to enhance corrosion of the components of conventional rotary unions. Another drawback of the joint compound 18 is that it has also been found to displace lubricating grease in moving components of the conventional rotary unions, as well as corrode diamond-like protective coatings applied to some components. Accordingly, the seals 42 include multiple, vertically displaced seals to present multiple barriers to unwanted seepage of joint compound 18 in the gap 36.

An important feature of the present rotary union 10 is that the central shaft 12 is provided in vertically-stacked components including an upper, inlet portion 46, a middle or central delivery portion 48 including the pockets and the outlets, and a lower-most base portion 50. An advantage of this format for the central shaft 12 is that the middle portion 48 is exposed to the most erosion from the flowing ready mix joint compound. Through the use of the present modular construction, the central shaft 12 is easily disassembled, and the middle portion 48 removed and replaced. The base portion 50 is preferably solid metal and is intended for structural support. Thus, the present rotary union 10 is configured for easy maintenance and reduced down time for servicing compared to conventional units. Also, the cost of maintenance of the present rotary union 10 is relatively low, since the materials for what would be the upper portion 46 and the lower, base portion 50 need not be replaced during the exchange of the middle portion 48.

To facilitate the assembly and operation of the present rotary union 10, the upper, middle and base portions 46, 48, 50 are preferably provided with complementary locating formations 52 for maintaining the portions in fixed relationship to each other upon assembly. In a preferred embodiment, the complementary locating formations 52 (schematically represented in FIGS. 1-3, include engaging pins 52a and sockets 52b on opposing surfaces 54, 56 of the portions. It is contemplated that either of the portions 46, 48 and 50 may have one of a pin 52a and a socket 52b, or multiple pins and/or sockets, depending on the application. Thus, while the complementary formations are shown as a pin 52a and a socket 52b in each formation 46, 48, 50, one formation may have a plurality of pins 52a, and the next vertically adjacent formation may have a plurality of complementary engaging sockets 52b or vice versa. While in FIG. 1, the complementary locating formations 52 are shown centrally located on the formations 46, 48, 50, it is contemplated that the location of the formations may vary to suit the application. Also, it is contemplated that other types of complementary formations are applicable, including but not limited to lugs and recesses or the like.

In an embodiment, the outlet nipples 34 are spaced at 60° from each other around the annular sleeve 30. However, other spacings of the nipples 34 are contemplated depending on the application. Also, preferably at least one outlet nipple 34 is provided with a radial, preferably elbow-shaped extension 58 projecting beyond an outer surface 60 of the sleeve 30 for enhancing the accuracy of the delivery of the joint compound 18 to the empty containers.

Referring to FIG. 1, the seals 42 include at least one upper seal 42a located in the gap 36 above 34 nipples, and at least one lower seal 42b located in the gap below the nipples. Also, rotation of the annular sleeve 30 relative to the central shaft 12 is facilitated by bearings 62 preferably located at upper and lower ends of the annular sleeve 30 in operational relationship to the central shaft 12. In the preferred embodiment, the bearings 62 are roller bearings in races, however other bearings are contemplated depending on the application.

Referring now to FIG. 2, when maintenance is required, such as the replacement of the middle portion 48, the upper portion 46 is lifted vertically, separating it from the middle portion 48. During lifting, the complementary locating formations 52a, 52b on the upper portion 46 become disengaged from the complementary formations on the middle portion 48. Next, the middle portion 48 is lifted out of the rotary union 10 and the complementary formations 52a, 52b between the middle portion and the lower, base portion 50 become disengaged. As described above although the complementary portions 52a, 52b are depicted as centrally located in the portions 46, 48, 50, it is contemplated that the location of the formations may vary to suit the application.

In most cases, only the middle portion 48 requires replacement. However, in cases where the lower, base portion 50 needs replacement, it too is lifted from the present rotary union 10 as shown, becoming disengaged from the annular sleeve 30. Once the respective formations 46, 48 and/or 50 are removed from the present rotary union 10, the operator has access to the seals 42 and the bearings 62 to replace them in order to preserve the protection of vulnerable parts of the present rotary union from the corrosive effects of the flowing joint compound 18.

Also seen in FIGS. 1 and 2 are air passageways 64 provided at least in the interior surface 40 of the annular sleeve 30. In conventional rotary unions, pressurized air is optionally distributed through the rotary union 10 through such passageways 64 to assist in the flow of the joint compound 18 and/or in the movement of the annular sleeve 30 about the central shaft 12 where desired.

Figure 3:
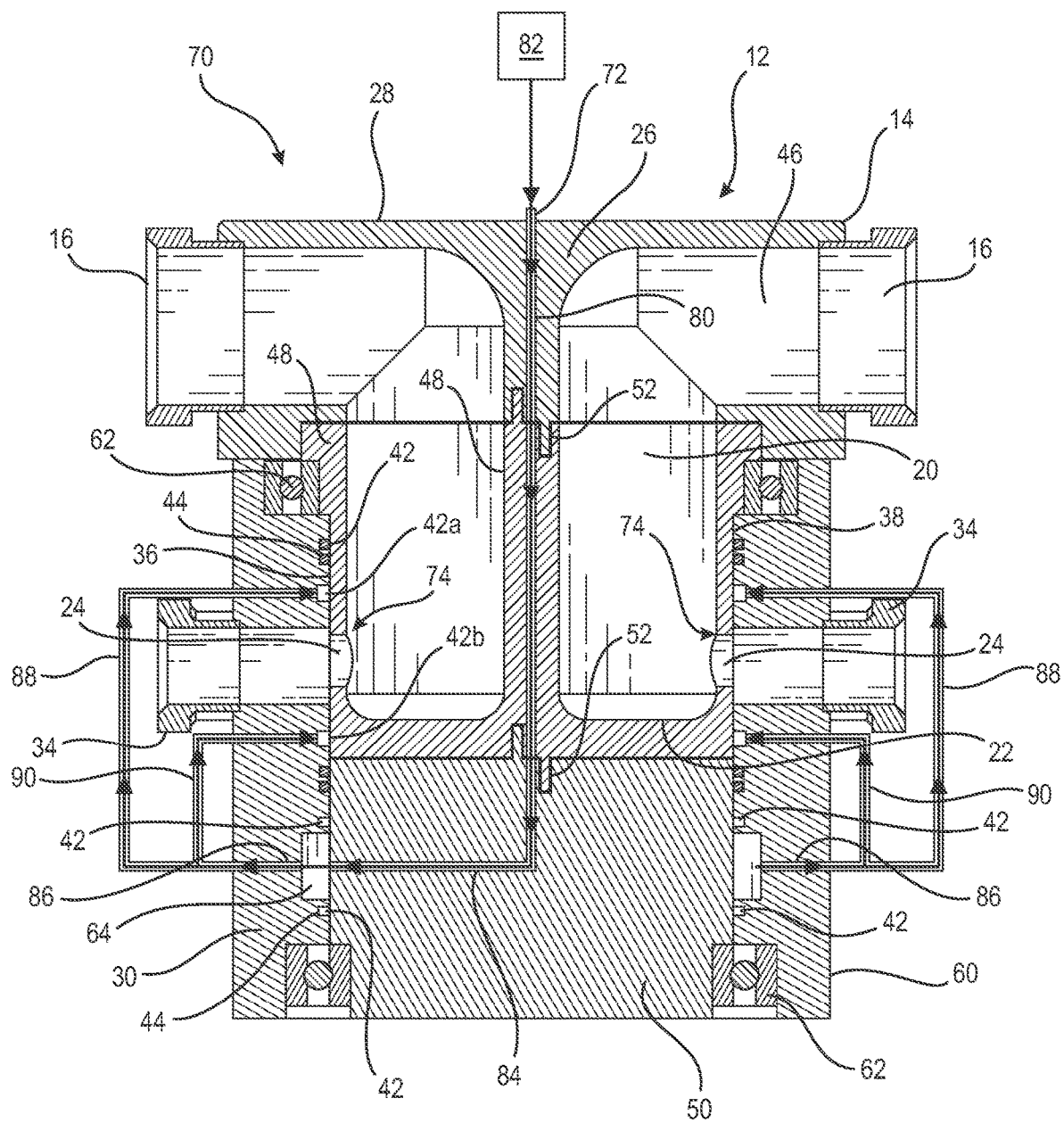
FIG. 3 is an alternate embodiment of the modular rotary union of FIG. 1 featuring an optional water flush system.

Referring now to FIG. 3, another embodiment of the present rotary union is generally designated 70. Components of the rotary union 70 shared with the rotary union 10 are designated with identical reference numbers. A main difference between the rotary unions 10 and 70 is the placement in the latter of at least one fluid supply conduit 72 shown schematically, and constructed and arranged for flushing the gap 36 in a space 74 defined between the at least one upper seal 42a and the at least one lower seal 42b. In the preferred embodiment, the fluid is water and the conduit 72 will also be referred to as a water supply conduit. Other fluids are contemplated that are compatible with the joint compound 18.

Due to the corrosive effects of seeping joint compound 18 described above, the function of the water supply conduit 72 is to flush the joint compound from the gap 36 and from the space 74 into the flow of the product ultimately distributed out the outlet nipples 34. In this manner, the water supply conduit 72 prevents the unwanted migration and eventual corrosion of the joint compound 18 on the rotary union 70. Further, the operational life of the seals 42 as well as the middle shaft portion 46 is prolonged.

Referring again to FIG. 3, the water supply conduit 72 includes a main conduit 80 preferably located in the central shaft 12 and connected to a source of fluid 82, preferably water, such as tap water, which is preferably pressurized by reducing the diameter of the conduit 72. The fluid source 82 is schematically represented, but is contemplated as including flow control mechanisms, float sensors, flow regulators, filters, holding tanks and the like all configured for distributing a source of fluid, preferably water under sufficient pressure to ultimately flush joint compound from the gap 36. A suitable pressure in the conduit 72 is in the range of 20-25 psi, however, other ranges are contemplated to suit the application. The use of pressurizing pumps (not shown) is also contemplated. It is contemplated that the specific location of the main conduit 80 optionally varies in the central shaft 12 to suit the application.

In one embodiment, the main conduit 80, preferably vertically oriented, extends to the base portion 50, then has a horizontal portion 84 in fluid communication with the annular air passageway 64. At least one and preferably a plurality of flow lines 86 are in fluid communication with the air passageway 64 and extend laterally and exterior to the rotating sleeve 30. An upper nipple conduit 88 and a lower nipple conduit 90 are in fluid communication with the flow line 86 and transmit water respectively back into the rotary sleeve 30 and to the upper and lower seals 42*a*, 42*b*. It is contemplated that the conduits and flow lines 80, 84, 86, 88 and 90 may be either flexible or rigid, depending on the application. The resulting flow of water into the gap 36 between the seals flushes any unwanted joint compound from the gap and ultimately out the nipples 34 along with the joint compound product 18. In this manner, corrosion of the middle portion 48, the rotating sleeve 30 and the associated seals 42 is prevented.

While a particular embodiment of the present modular rotary union has been described herein, it will be appreciated by those skilled in the art that changes and modifications may be made thereto without departing from the invention in its broader aspects and as set forth in the following claims.

The invention claimed is:

1. A rotary union for distributing flowing material to open packages, comprising:
  a central shaft having an upper end defining at least one inlet configured for receiving a supply of the flowing material, and being in communication with a pocket for the material defined in said upper end, a lower end of said pocket defining at least one outlet port;
  an annular sleeve configured to surround and to rotate relative to said central shaft, said sleeve provided with a plurality of radially-spaced outlet nipples;
  a gap being defined between an exterior surface of said central shaft and an interior surface of said sleeve;
  at least one seal disposed in said gap for isolating said gap from the material flowing from said pocket through said outlet port and into said nipples; and
  said central shaft being provided in vertically-stacked components including upper, inlet portion, a middle or central delivery portion including the pockets and the outlets, and a lower-most base portion.

2. The rotary union of claim 1, further including said portions having complementary locating formations for maintaining said portions in fixed relationship to each other upon assembly.

3. The rotary union of claim 2, wherein said complementary locating formations include engaging pins and sockets on opposing surfaces of said portions.

4. The rotary union of claim 1, wherein said nipples are spaced at 60° from each other around said sleeve.

5. The rotary union of claim 1, wherein said at least one seal includes at least one upper seal located in said gap above said nipples, and at least one lower seal located in said gap below said nipples.

6. The rotary union of claim 1, further including bearings at upper and lower ends of said sleeve in operational relationship to said shaft.

7. The rotary union of claim 1, wherein at least one said nipple is provided with a radial extension projecting beyond an outer surface of said sleeve.

8. The rotary union of claim 1, further including at least one water supply conduit associated with said union and constructed and arranged for flushing said gap in a space defined between at least one upper seal and at least one lower seal.

9. The rotary union of claim 8, wherein said water supply conduit includes a main conduit located in said shaft, and at least one supplemental conduit in fluid communication with said main conduit.

10. The rotary union of claim 8, wherein said at least one water supply conduit is configured for directing a flow of fluid from said gap to said nipples.

11. A rotary union for distributing viscous material to open packages, comprising:
  a central shaft having an upper end defining at least one inlet configured for receiving a supply of the viscous material, and being in communication with a pocket for the viscous material defined in said upper end, a lower end of said reservoir defining at least one outlet port;
  an annular sleeve configured to surround and to rotate relative to said central shaft, said sleeve provided with a plurality of radially-spaced outlet nipples;
  a gap being defined between an exterior surface of said central shaft and an interior surface of said sleeve;
  at least one seal disposed in said gap for isolating said gap from the viscous material flowing from said pocket through said outlet port and into said nipples, said at least one seal including at least one upper seal and at least one lower seal;
  said central shaft being provided in vertically-stacked components including upper, inlet portion, a middle or central delivery portion including the pockets and the outlets, and a lower-most base portion; and
  at least one water supply conduit associated with said shaft and constructed and arranged for flushing said gap in a space defined between at least one upper seal and at least one lower seal.

12. The rotary union of claim 11, further including complementary locating formations for maintaining said portions in fixed relationship to each other upon assembly.

13. The rotary union of claim 11, wherein said water supply conduit includes a main conduit located in said shaft, and at least one supplemental conduit in fluid communication with said main conduit, and located in said sleeve.

14. The rotary union of claim 11, wherein said at least one water supply conduit is configured for directing a flow of fluid from said gap to said nipples.

* * * * *